(No Model.) 2 Sheets—Sheet 1.
P. L. WILKERSON.
AUTOMATIC PHOTOGRAPHIC SHUTTER.
No. 573,499. Patented Dec. 22, 1896.
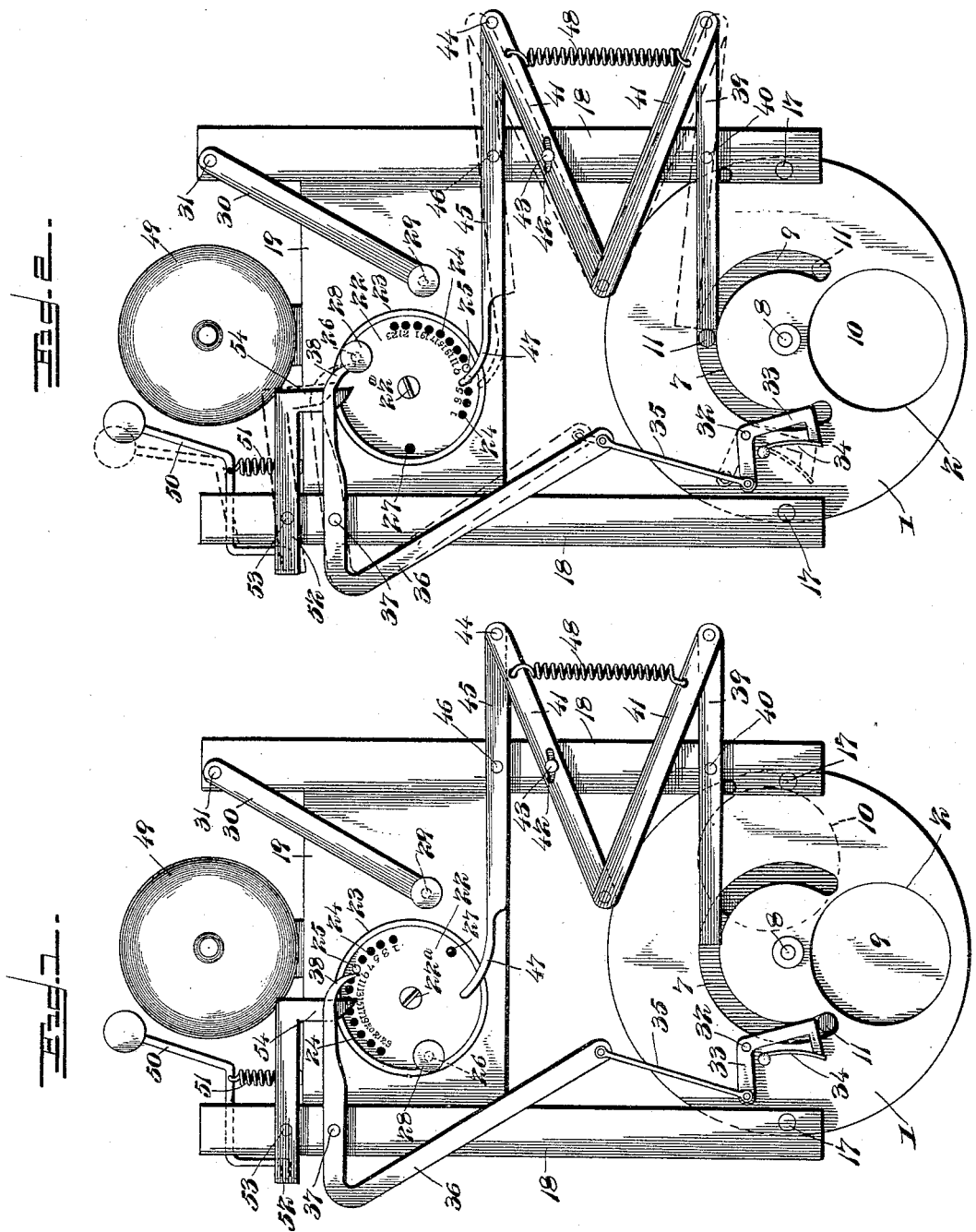
Witnesses
E. H. Stewart
L. P. Mulhaupter
Inventor
Pery L. Wilkerson
By his Attorneys,
C. A. Snow & Co.

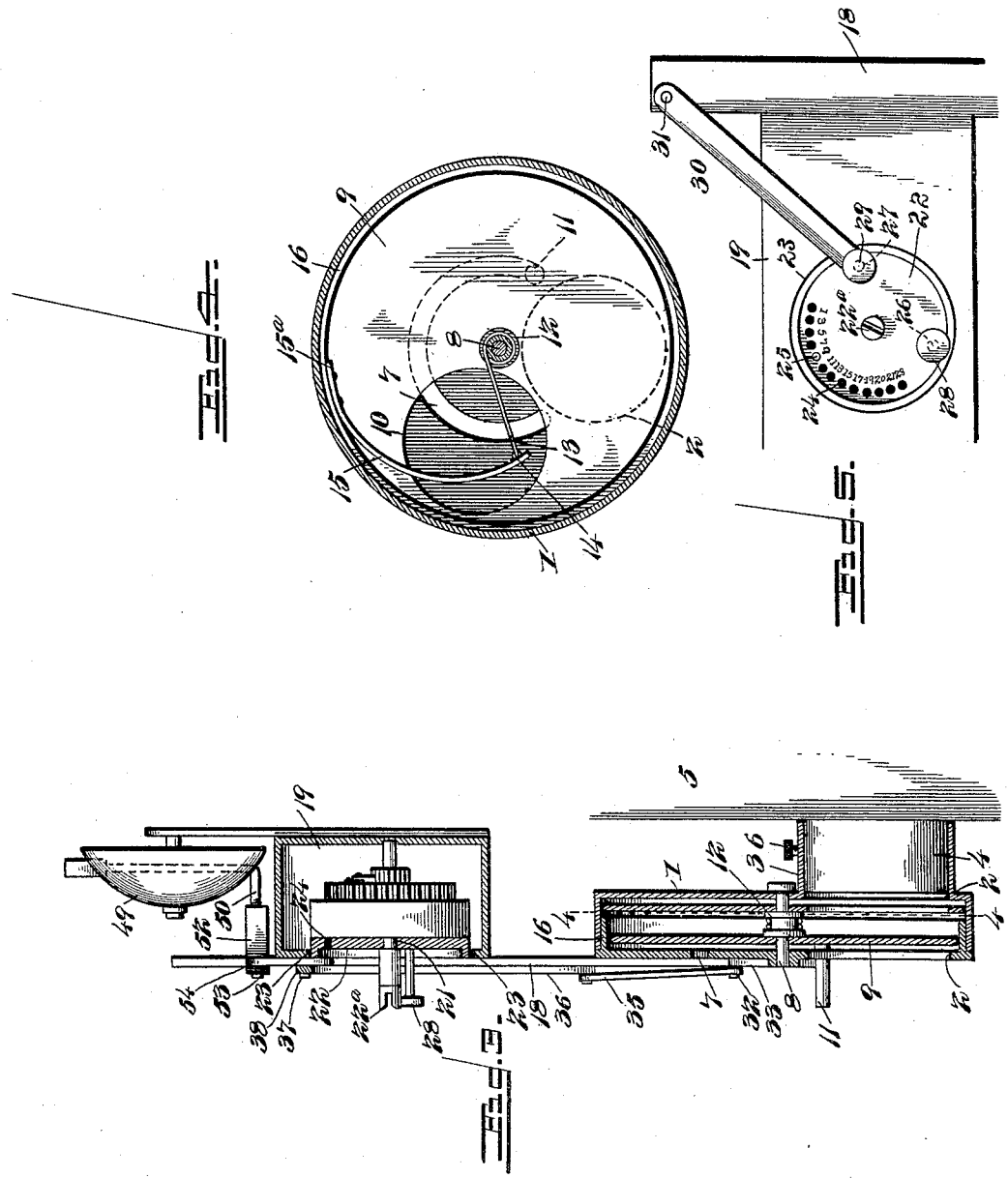

UNITED STATES PATENT OFFICE.

PERY L. WILKERSON, OF YORK STATION, ALABAMA.

AUTOMATIC PHOTOGRAPHIC SHUTTER.

SPECIFICATION forming part of Letters Patent No. 573,499, dated December 22, 1896.

Application filed June 25, 1896. Serial No. 596,879. (No model.)

*To all whom it may concern:*

Be it known that I, PERY L. WILKERSON, a citizen of the United States, residing at York Station, in the county of Sumter and State of Alabama, have invented a new and useful Automatic Shutter for Cameras, of which the following is a specification.

This invention relates to automatic shutters for photographic cameras; and it has for its object to provide a new and useful shutter attachment for cameras that shall provide simple and positive means for accurately and automatically giving any predetermined number of seconds exposure without the aid of a timepiece and without manual manipulation after being set.

To this end the main and primary object of the present invention is to overcome the many objections to the pneumatic and similar shutters controlled manually, while at the same time overcoming the inaccuracies which are incident to the use of an ordinary timepiece in timing an exposure.

With these and other objects in view, which will readily appear as the nature of the invention is better understood, the same consists in the novel construction, combination, and arrangement of parts hereinafter more fully described, illustrated, and claimed.

In the drawings, Figure 1 is a front elevation of an automatic shutter constructed in accordance with this invention and the various parts of which are "set." Fig. 2 is a similar view of the automatic shutter, showing the parts in the position which they occupy just after the opening of the shutter and immediately before the closing thereof by the closing trip-plug. Fig. 3 is a vertical sectional view of the shutter shown attached to the lens-tube of a photographic camera. Fig. 4 is a vertical sectional view of the shutter proper on the line 4 4 of Fig. 3. Fig. 5 is a detail elevation illustrating the lock connection between the trip-dial and brake-arm.

Referring to the accompanying drawings, 1 designates a circular shutter box or casing provided therein with the alined eccentrically-disposed shutter-openings 2, and at one side with an offstanding attaching-collar 3, surrounding the shutter-opening at one side of the box or casing and adapted to fit over the front end of the usual lens-tube 4 of an ordinary photographic camera 5, as illustrated in Fig. 3 of the drawings, and said attaching-collar 3 has mounted in one side thereof a set-screw 6, adapted to impinge on the lens-tube 4 to provide for securely holding the shutter attachment in place thereon, as will be readily understood.

The circular shutter-box 1 is further provided in one side thereof directly above one of the shutter-openings 2 with a segmental slot 7, the function of which will be more particularly referred to, and the opposite sides of the box 1 have fitted centrally therein the opposite extremities of the short bearing-spindle 8, on which is mounted the rotating spring-actuated shutter-disk 9. The rotating spring-actuated shutter-disk 9 works entirely within the box 1 and is provided with an eccentrically-disposed exposure-opening 10, adapted to be thrown in and out of alinement with the shutter-openings 2 in opposite sides of the box, and therefore in and out of alinement with the lens carried by the lens-tube 4 of the camera.

The rotating shutter-disk 9 within the circular box 1 is provided at one side with an offstanding catch-pin 11, working in the slot 7 and having a play from end to end of the slot, and said disk 9 is further provided at one side of its center with a small winding-spool 12, to which is connected one end of a string or other flexible connection 13, the other end of which string is connected at 14 to the free end of a leaf-spring 15, arranged entirely within the box 1 and secured fast at one end, as at 15ª, to the inner side of the rim 16 of the shutter-box. The free end of the spring 15 has a play within the shutter-box at one side of the shutter-disk toward and away from the central pivot or bearing of such disk, and the free end of said spring exerts a normal tension outward and rotates the disk 9 in a direction that normally holds the exposure-opening 10 therein out of alinement with the shutter-openings 2 of the shutter-box.

In the present invention the circular shutter-box 1 has suitably connected thereto at diametrically opposite points, as at 17, the lower ends of opposite upright frame-arms 18, to which frame-arms is suitably secured at a point above the box 1 a motor-casing 19, which accommodates therein the motor or operating mechanism for controlling the shutter-disk to give an exposure of any predetermined number of seconds. The motor-casing 19 has preferably mounted therein ordinary clock mechanism, the winding-shaft 21 of which is extended through the front side of the casing 19 and has detachably fitted thereon a rotating trip-dial 22, said trip-dial being preferably secured in place on the front end of the winding-shaft 21 of the clock mechanism by means of the winding-key 22ª, which can be conveniently engaged at any time for the purpose of rewinding the spring of the clock mechanism when exhausted. The rotating trip-dial, actuated by the clock mechanism by reason of being carried on one of the shafts of such mechanism, is arranged to work within the dial-opening 23, formed in the front side of the motor-casing 19, and said trip-dial is further provided in its face and near the periphery thereof with a circular series or group of regulating-openings 24, which are consecutively numbered by numbers designating the number of seconds exposure which the particular openings are graduated for, and said openings 24 are designed to adjustably receive therein a shutter-closing trip-plug 25. At points spaced from the circular series or groups of openings 24 the dial 22 is further provided near its periphery with a single plug-opening 26 and a stop-opening 27, the opening 26 being designed to removably receive therein a shutter-opening trip-plug 28, which, with respect to the operation of the closing-plug 25, travels in advance of the said latter plug. The single stop-opening 27 of the trip-dial 22 is designed to be engaged by a stop-pin 29, mounted in the free end of a brake-arm 30, the other end of which is pivotally secured, as at 31, to one of the frame-arms 18 at a suitable point, so as to allow the pin 29 to be disengaged from the dial and swung out of the path of movement of the same when the mechanism is set in operation, while at the same time allowing the pin 29 to be readily engaged in the opening 27 after an exposure to provide for stopping the rotation of the dial while not in use, as will be readily understood.

Pivotally mounted on the front side of the circular shutter-box 1 at the point 32 is a bell-crank shutter-opening catch-lever 33, one end of which lever 33 has arranged at one side thereof a spring 34 for normally holding said end of the lever projected across the segmental slot 7 near one end of said slot, so as to engage at one side of the catch-pin 11 of the shutter-disk 9, when such catch-pin is moved to the end of the slot 7 near the lever 33, to provide for "setting" the shutter-disk ready for an exposure. The end of the lever 33 opposite the spring-pressed end has connected thereto one end of a connecting-link or wire 35, the other end of which link is pivotally connected to one end or arm of a bell-crank trip-lever 36, adjustably pivoted by one of its arms, as at 37, to one of the upright frame-arms 18 adjacent to the rotating trip-dial 22. One end of the pivotally-supported bell-crank trip-lever 36 is provided with a curved trip-bill 38, which projects within the plane of the dial-opening 23 and lies in front of the said dial in the path of movement of the plugs carried thereby, so that when the said bill 38 is engaged against by the plug 28 the lever 36 is moved in a direction to oscillate the catch-lever 33 and disengage the same from the pin 11, thereby allowing the spring 15 to automatically rotate the disk 9 and carry the said pin 11 against one end of a shutter-closing catch-lever 39. The stop end of the lever 39 engaged by the pin 11 is normally projected over the slot 7, at a point intermediate between the ends of such slots, to provide for holding the disk 9 in a position with its exposure-opening 10 in alinement with the shutter-openings 2 and the lens of the camera, so as to hold the shutter open sufficiently long to give the desired exposure. The shutter-closing catch-lever 39 is pivotally mounted intermediate of its ends, as at 40, at the front side of the shutter-box 1, and has pivotally connected to its outer end the lower one of a pair of toggle-levers 41, the upper of which toggle-levers 41 is provided between its ends with a curved slot 42, receiving a guide screw or pin 43, secured in one of the upright frame-arms 18 and providing for limiting the movement of the upper toggle-lever 41 to a sufficient degree to insure the rapid movement of the lever 39 when such lever disengages itself from the pin 11.

The upper toggle-lever 41 is pivotally connected at one end, as at 44, to one end of a shutter-closing trip-lever 45, pivotally supported between its ends, as at 46, on one of the uprights 15, and provided at its end opposite the connection 44 with a trip-bill 47, curved so as to lie in the path of movement of the plugs carried by the trip-dial, and which when engaged by the plug 25 provides for quickly oscillating the lever 39 in a direction to release the pin 11 and allow it to fly to the end of the slot opposite the lever 33, and in this rotation of the shutter-disk the exposure-opening is thrown out of alinement with the openings 2 and the lens, so as to close the shutter. A retractile spring 48 is arranged between and connects the toggle-levers 41 to provide for normally positioning the levers 39 and 45 after being oscillated in one direction by the action of the trip-plug 25.

The motor-casing 19 supports above the same a suitable alarm-bell or gong 49, at one side of which is arranged a hammer-carrying arm 50, normally drawn against the bell by a retractile spring 51, and said hammer-carrying arm is suitably connected with one end of an alarm trip-lever 52. The alarm trip-lever 52 is pivotally supported intermediate of its ends, as at 53, and is provided at the end opposite the connection of the arm 50 therewith with a depending trip-foot 54, lying adjacent to and at one side of the trip-bill 58, and adapted to be engaged in advance of said bill by the trip-plug 28, so as to cause an alarm to be sounded immediately before the shutter is thrown open, which is a very important feature in photographing persons singly or in groups, the alarm serving to prompt the subject or subjects to pose at the proper moment.

From the foregoing it is thought that the operation of the herein-described shutter will be readily apparent to those skilled in the art, but, again briefly referring to the operation, it is to be understood that the trip-plug 25 is adjusted to any of the openings 24, according to the number of seconds exposure required, and after a proper setting of both the plugs 25 and 28, with the parts arranged as shown in Fig. 1 of the drawings, it will be noted that the pin 28 first engages the trip-foot 54, causing an alarm to be sounded by the bell, and then immediately engages against the trip-bill 38 and operates the catch-lever 33, so as to release the shutter-disk and allow the same to fly to an open position with the pin 11 thereof engaging against the stop end of the catch-lever 39. After the shutter-disk is opened in this manner the plug 25, which has been previously adjusted as referred to, rides against the bill 47, and, through the medium of the connections described, releases the lever 39 from the pin 11 and allows the shutter-disk to rotate to its normal closed position. In rewinding the motor or mechanism both plugs 25 and 28 are removed, so as not to interfere with the operation of winding.

Changes in the form, proportion, and the minor details of construction may be resorted to without departing from the principle or sacrificing any of the advantages of this invention.

Having thus described the invention, what is claimed, and desired to be secured by Letters Patent, is—

1. In an automatic shutter, a shutter-box having shutter-openings, a spring-actuated rotary shutter-disk working within the box and having an exposure-opening, separate catch devices for securing the shutter in a set and an open position, suitably-arranged time or clock mechanism having a continuously-moving trip device, and suitably-arranged lever connections between the trip device and said catch devices to provide means for automatically releasing the shutter from its set and open positions at predetermined intervals, substantially as set forth.

2. In an automatic shutter, a shutter-box having shutter-openings, a spring-actuated rotary shutter-disk working within the box and having an exposure-opening and an offstanding catch-pin working through a slot in the box, separate catch devices for engaging said catch-pin to hold the shutter-disk in a set and an open position, time mechanism having a rotating trip device, and suitable connections between said trip device and said catch devices for automatically releasing the shutter from its set and open positions at predetermined intervals, substantially as set forth.

3. In an automatic shutter, a shutter-box, a spring-actuated rotary shutter-disk working within the box and having an offstanding catch-pin working through a slot in the box, a motor-casing supported above the shutter-box, clock mechanism mounted within said casing, a rotating trip-dial mounted on one of the shafts of said mechanism and carrying trip-plugs, separate catch devices for engaging the catch-pin at different points, and suitably-arranged trip-levers adapted to be engaged by the trip-plugs of the dial and having operating connections with said catch devices, substantially as set forth.

4. In an automatic shutter, a shutter-box, a spring-actuated rotary shutter-disk having a catch-pin working through a segmental slot in the box, a motor-rotated trip-dial provided near its periphery with a circular series or group of regulating-openings and at a point spaced from said series or groups of openings with a single plug-opening, a trip-plug detachably fitted in said single plug-opening, a separate trip-plug adapted to adjustably engage said series of openings, separate catch devices for engaging said catch-pin at different points, and suitably-arranged trip-levers arranged in the path of said trip-plugs and connected with said catch devices, substantially as set forth.

5. In an automatic shutter, a shutter-box, a spring-actuated rotary shutter-disk having a rotary catch-pin working through a segmental slot in the box, a motor-rotated trip-dial provided with suitably-arranged openings, spaced trip-plugs detachably fitted in openings in the dial, a catch-lever pivotally mounted on the shutter-box and having one end thereof normally projected over the segmental slot at one end, a separate catch-lever pivotally supported on the shutter-box and having one end projected over the segmental slot at an intermediate point between the ends of the slot, said catch-levers engaging said catch-pin to hold the shutter-disk respectively "set" and "open," separate oppositely-arranged trip-levers pivotally supported adjacent to the dial and provided at one end with trip-bills disposed in the path of movement of said trip-plugs, a suitable connection between one of said trip-levers and the catch-lever near one end of the segmental slot, and spring-retracted toggle-levers connecting the other trip-lever with the other catch-lever, substantially as set forth.

6. In an automatic shutter, a shutter-box, a spring-actuated rotary shutter-disk, a motor-rotated trip-dial carrying spaced trip-plugs, separate catch devices for securing the shutter-disk in a set and an open position, suitably-mounted trip-levers arranged in the path of said trip-plugs and connected with said catch devices, an alarm-bell, an alarm trip-lever carrying a spring-retracted hammer-arm and provided at one end with a trip-foot disposed adjacent to one end of one of said other trip-levers in the path of movement of said trip-plugs, and a pivotally-supported brake-arm carrying a pin adapted to engage with the dial to secure the same against rotation, substantially as set forth.

In testimony that I claim the foregoing as my own I have hereto affixed my signature in the presence of two witnesses.

PERY L. WILKERSON.

Witnesses:
D. H. MAGGARD,
E. W. EZELL.